United States Patent [19]

Conger

[11] Patent Number: 4,613,058
[45] Date of Patent: Sep. 23, 1986

[54] ROTARY VOLUMETRIC LOADING METER

[76] Inventor: Roger C. Conger, 111 SE. Bedford, Minneapolis, Minn. 55414

[21] Appl. No.: 731,123

[22] Filed: May 6, 1985

Related U.S. Application Data

[63] Continuation of Ser. No. 465,037, Feb. 7, 1983, abandoned.

[51] Int. Cl.⁴ .............................................. G01F 11/10
[52] U.S. Cl. .................................... 222/36; 222/342; 222/345; 222/370
[58] Field of Search ............... 222/370, 367, 302, 288, 222/344–346, 342, 349, 352, 36, 347, 355, 410; 221/265

[56] References Cited

U.S. PATENT DOCUMENTS

| 31,530 | 2/1861 | Cluxton | 222/370 X |
| 479,982 | 8/1892 | Heath | 222/370 |
| 1,038,178 | 9/1912 | Mills | 222/346 |
| 1,900,458 | 3/1933 | Morrow | 222/36 X |
| 2,193,235 | 3/1940 | Jones et al. | 222/370 X |
| 2,738,903 | 3/1956 | Henry et al. | 222/370 X |
| 2,901,150 | 8/1959 | Matter | 222/370 |
| 3,052,383 | 9/1962 | Transeau | 222/345 |
| 3,221,949 | 12/1965 | Dingus | 222/370 X |
| 4,169,419 | 10/1979 | Burgess | 222/370 X |

Primary Examiner—Joseph J. Rolla
Assistant Examiner—Kevin P. Shaver
Attorney, Agent, or Firm—Orrin M. Haugen; Thomas J. Nikolai; Frederick W. Niebuhr

[57] ABSTRACT

A rotary drum metering feeder device which includes an outer casing defining a generally cylindrical chamber with opposed top and bottom end plates, a rotary drum means including a generally vertically disposed central shaft journably retained within the end plates and having a plurality of generally radially disposed blades secured at their inner ends to the central shaft and at their outer ends to an outer sleeve, and defining a plurality of metering chambers therebetween. An inlet port is formed within the top end plate, and an outlet port within the bottom end plate, and with each of the ports having edge surfaces, and with the edge surfaces of the inlet port being spaced from each of the edge surfaces of the outlet plate so as to provide for closed arcuate web zones in the end plates between the ports. A wiper blade is secured to the top end plate and extends radially across the inlet port, with the inner end of the wiper blade being maintained in close running clearance with each of the chamber defining blades so as to level the charge of material contained within each of the chambers during rotation. A counter is provided for counting the number of revolutions of the drum to determine delivery volume.

6 Claims, 4 Drawing Figures

ROTARY VOLUMETRIC LOADING METER

This is a continuation of application Ser. No. 465,037, filed Feb. 7, 1983, now abandoned.

BACKGROUND OF THE INVENTION

The present invention relates generally to a rotary drum metering feeder device, and more specifically to a rotary drum metering feeder for particulate solids, such as grain and the like with the metering feeder of the present invention being provided with baffling means to block and avoid free-flowing of grain or other particulate solids through the device. Metering feeder devices are desirable, if not requisite, in the handling of grain and other material being shipped overland or overseas by rail truck, barge or boat with such metering devices being used to provide accurate shipping weights, thereby avoiding the cost penalty of underweight shipments, as well as the cost and risk penalties of overweight shipments.

Particulate solids such as grain are typically stored in grain elevators or bins pending shipment to ultimate destination. Typically, grain elevators are located along railroad sidings for quick access to railroad grain cars and/or tanks. The conditions of shipment frequently require the shipper to adhere to maximum loading limits, with such maximum limits being imposed because of limitations on equipment or for other safety purposes. Grain shippers must avoid the economic problems encountered from underweight shipments, while, at the same, time, avoiding the penalties and risks of overweight shipments. The apparatus of the present invention makes it possible for grain elevator personnel expeditiously and accurately load grain cars or other shipping vessels with accurate weights and measures of grain and without any tendency for free-flowing of grain through the device.

Briefly, the apparatus of the present invention comprises a rotary drum metering feeder device with a casing defining a cylindrical chamber with opposed end plates. A baffled inlet port is formed in the top end plate, and an outlet port in the bottom end plate, and with an internally disposed rotary sleeve or drum being journaled for rotation between the opposed end plates. The internal drum includes a central shaft having a plurality of generally disposed blades secured thereto for forming a plurality of individual metering chambers carrying the particulate solids, such as grain, between the inlet port and the outlet port. The edge surfaces of each of the inlet port and the outlet port are arranged in spaced-apart relationship, so as to provide an arcuate web extending between each of the ports, thereby improving accuracy and repeatability for delivery. For determining or indicating the volumetric quantity delivered, counter means are provided for counting the number of rotations of the central shaft. The rotary drum metering feeder device of the present invention is small, compact and efficient in its operation, and may be readily installed within any grain storage facility upon construction or in an existing facility.

Therefore, it is a primary object of the present invention to provide an improved rotary drum metering feeder device with a baffled inlet means and with the feeder device being particularly adapted for accurate and efficient delivery of volumetric quantities of particulate solids, and specifically grain.

It is a further object of the present invention to provide a rotary drum metering feeder device for use in the unloading of stored grain, such as from a grain elevator, silo or the like, and for delivering measured quantities for the grain to a transport container.

It is yet a further object of the invention to provide an improved rotary drum metering feeder device which is safe and reliable in its operation, and which requires little, if any periodic maintenance.

Other and further objects of the present invention will become apparent to those skilled in the art upon a study of the following specification, appended claims, and accompanying drawings.

IN THE DRAWINGS

DESCRIPTION OF THE PREFERRED EMBODIMENT

Figure 1:
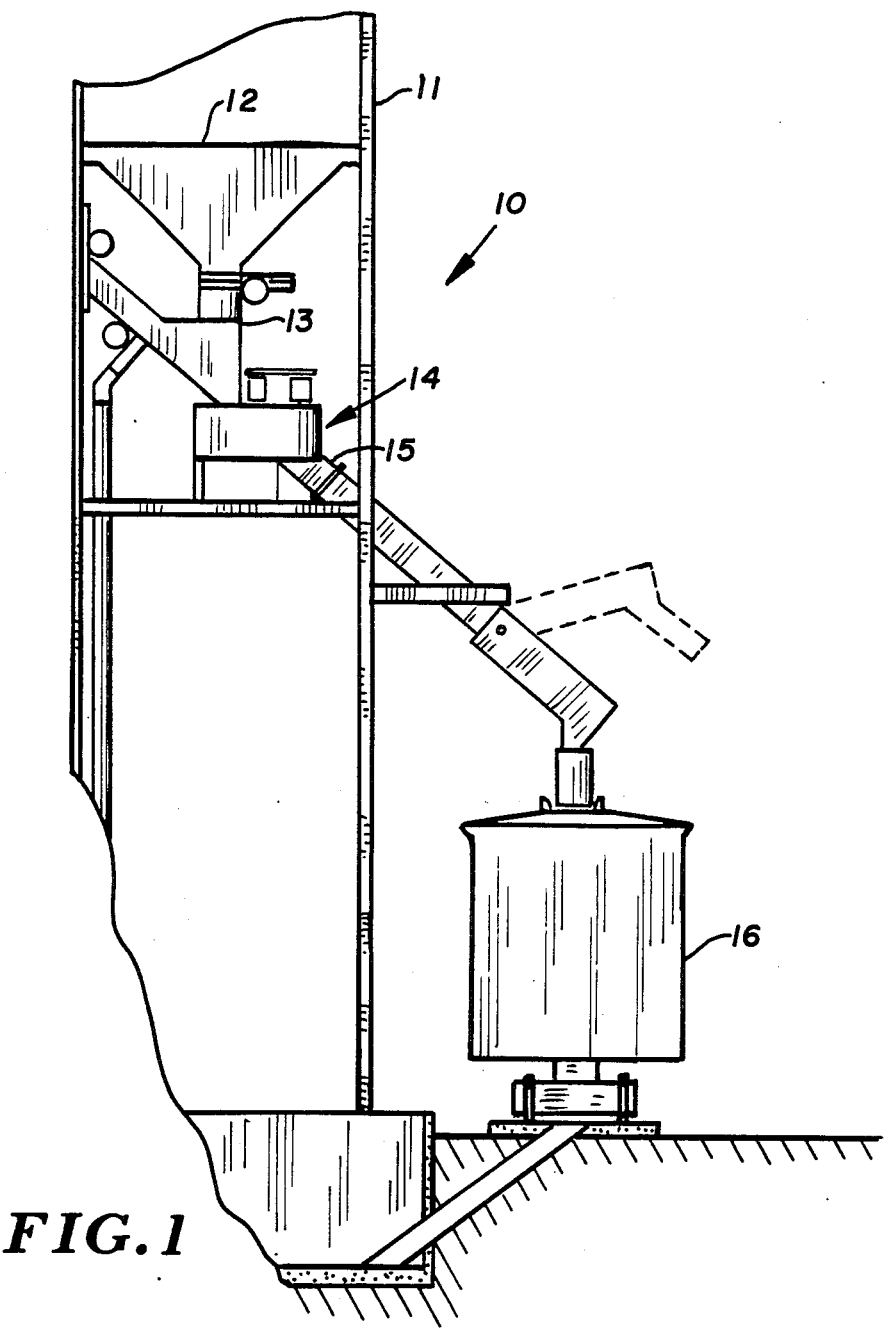
FIG. 1 is a side elevational view of the interior portion of a grain storage facility including a rotary drum metering feeder device prepared in accordance with the present invention contained therewithin, with the arrangement of FIG. 1 being typical for utilization of rotary drum metering feeder devices of the present invention.

In accordance with the preferred embodiment of the present invention, with particular attention being directed to FIG. 1 of the drawings, the grain handling facility generally designated 10 includes a delivery tower 11 in which there is installed a hopper 12 having an output duct 13 for delivering grain or other particular solid materials to the rotary drum metering feeder generally designated 14, with the rotary feeder device having and outlet duct as at 15 for ultimate delivery of metered material to rail car 16. It will be appreciated, of course, that the rotary drum metering feeder 14 may be employed and installed in a variety of applications, with this application merely being deemed typical for the device.

Figure 2:
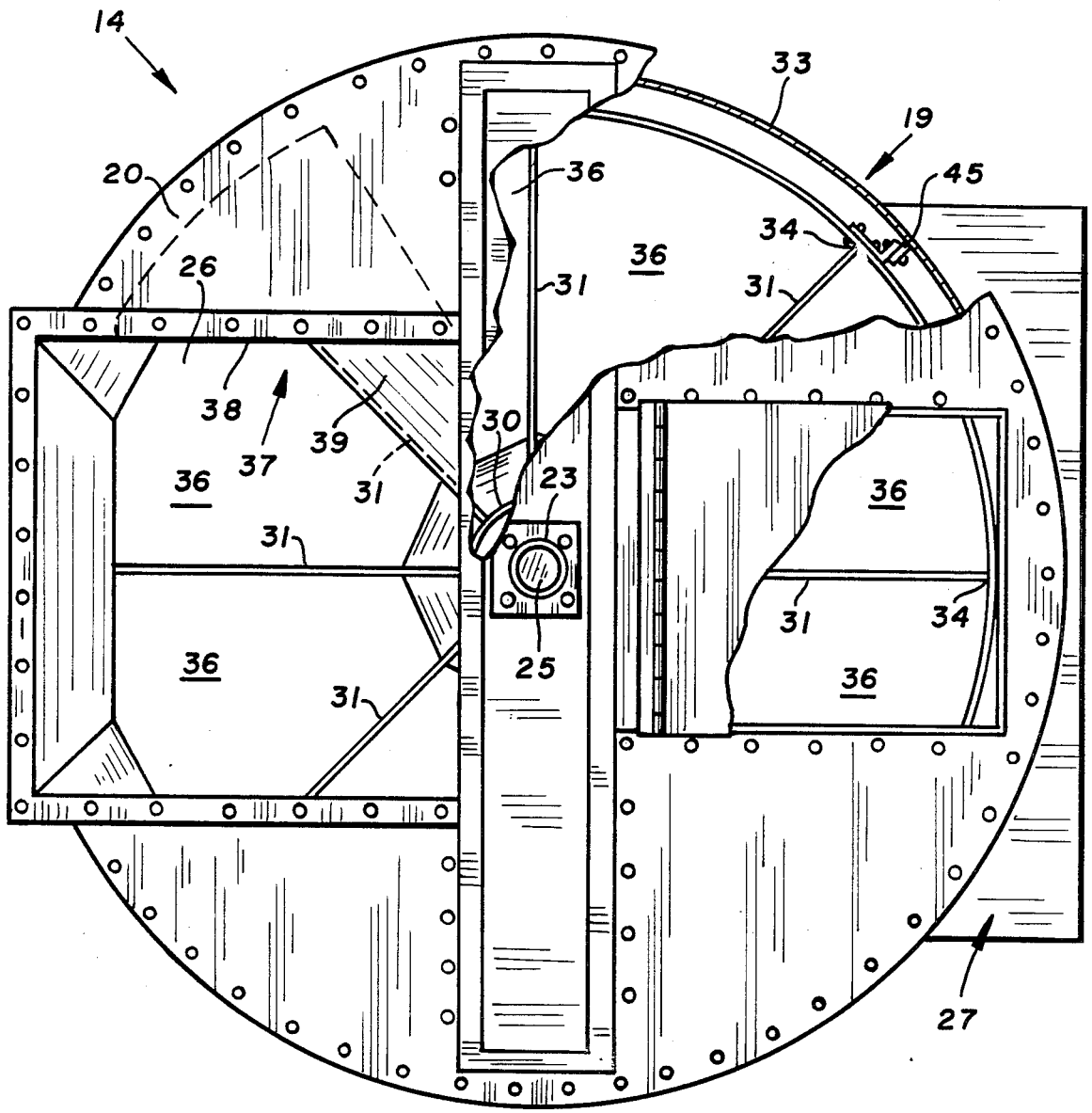
FIG. 2 is a top plan view of the rotary drum metering feeder device of the present invention, partially cut away, and showing the disposition of the rotatary element and the inlet port and inspection port therefor.
Figure 3:
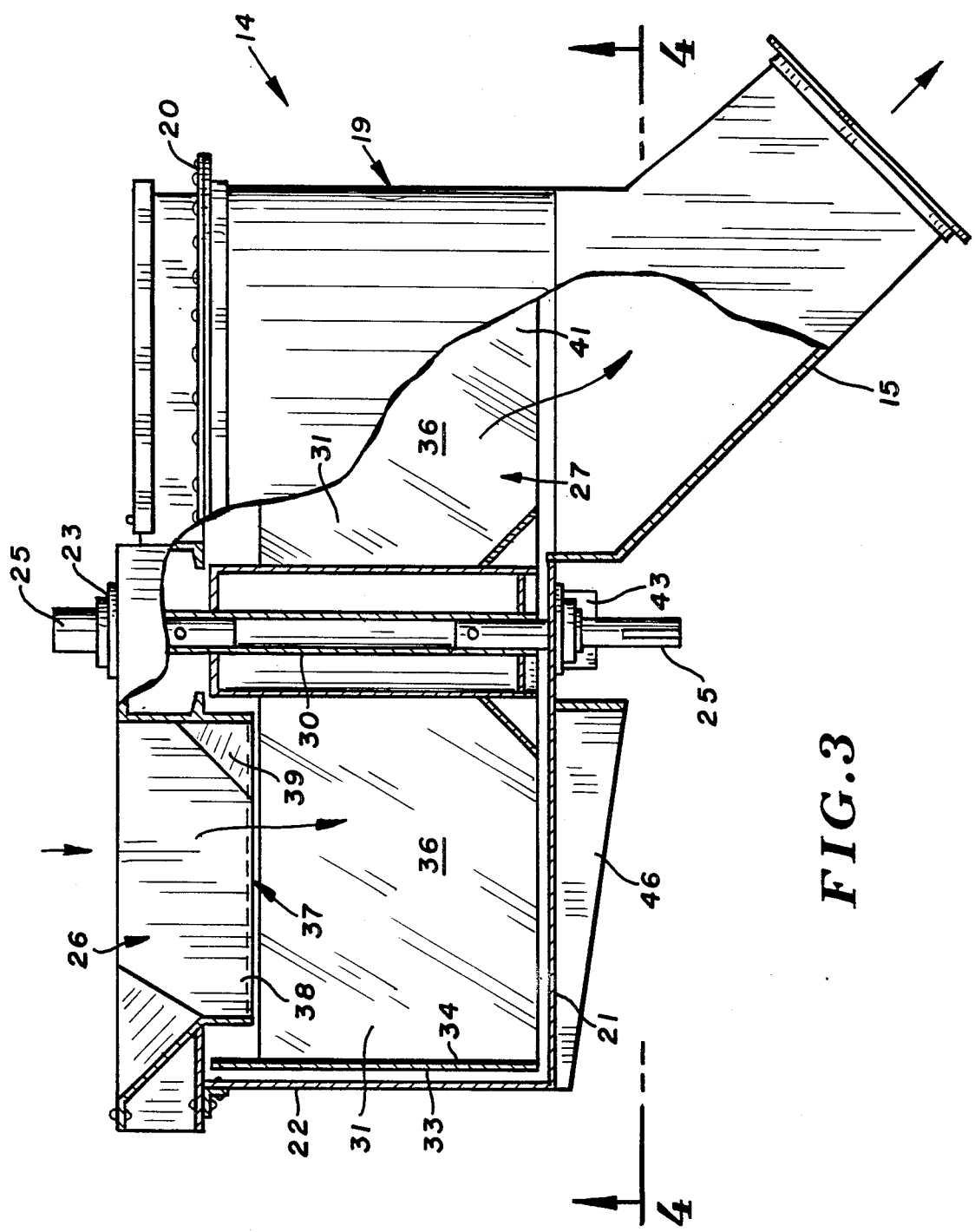
FIG. 3 is a side elevational, view, partially cut away and partially in section, and illustrating the rotary drum metering feeder device, with this view also including the details of the outer casing as well as the rotary mechanism contained therein.
Figure 4:
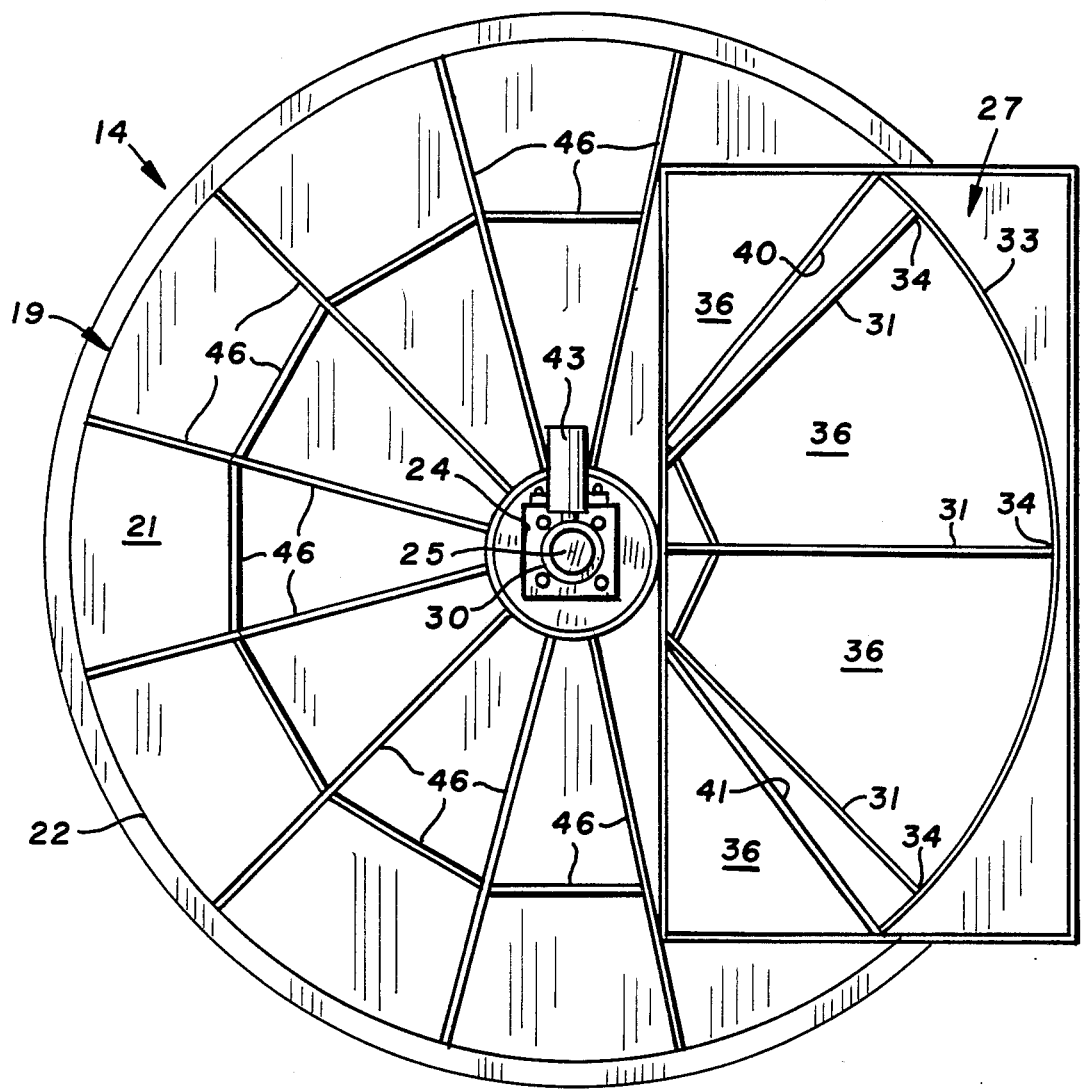
FIG. 4 is a bottom plan view of the rotary drum metering feeder device, and illustrating the details of the bottom end plate thereof.

Attention now being directed to FIGS. 2 and 3 of the drawings, the rotary drum metering feeder device 14 includes a casing means generally designated 19 including a top end plate 20, a bottom end plate 21, and a generally cylindrical shell member 22. Journal bearings are provided in the top and bottom end plates as at 23 and 24, with central shaft 25 being shown extending outwardly from each of these bearings 23 and 24. As is apparent, the top end plate 20 is provided with a baffled inlet port as at 26, with bottom end plate 21 being provided with an outlet port as at 27.

The drum feeder means includes an internal rotary drum assembly including the central shaft as at 25, with shaft 25 being journalably retained within bearings 23 and 24 as previously indicated. A pluraltiy of radially disposed blades such as blades 31—31 are provided, with the blades 31—31 being secured at their inner edges to the surface of central shaft sleeve or shroud 30, and being further secured at their outer edge surfaces to the inner surface of sleeve 33 as at 34—34. As is apparent, the disposition of the radially disposed blades 31—31 along with the central shaft 30 and sleeve 33 define a plurality of metering chambers 36—36 generally designated.

With attention continuing to be directed to FIGS. 2 and 3, it will be noted that the inlet port 26 is provided with a baffle as at 37 having a straight planar edge surface 38 and a canted edge surface or delivery-baffle 39 disposed at approximately 45° from the axis of drum-assembly and shaft 25, it being further understood that edge surfaces 38 and 39 of baffle 37 may be in the form of a continuium, such as when inlet 26 is circular. In such a case edge surfaces 38 and 39 are each portions of a circle at the end of a cylindrical sleeve with portion 39 functioning as an inlet guide. Outlet port 27 is likewise provided with edge surfaces, such as at 40 and 41. The angular disposition or arcuate disposition, of edge surfaces 38, 39, 40 and 41 is such that the arcuate displacement defines a closed arcuate web zone therebetween. This assures that the particulate solids, such as grain, retained within the rotary drum metering feeder device will have a certain resident time therewithin, so as to avoid any free throughput of metered material.

With respect to the edges of inlet port 26, as at 38 and 39, these edge surfaces provide a slrike-off or wiper blade means with edge surface 39 aligned with the drum feeder radius and edge surface 38 extending non radially outward beyond edge surface 39. The edge surface 39 being inclined relative to the edge surface 38 to define an obtuse angle inwardly of inlet port 26, both edge surfaces 38 and 39 disposed in close running relationship or clearance to each of the radially disposed blades 31—31. In this instance, the edges 38 and 39 prevent free-flowing of grain or other particulate solids through the device. Edges 38 and 39 form a baffle means to maintain a level charge of particulate solids or grain within each of the chambers 36—36 during operation of the device and avoid free flow therethrough.

In order to provide an indication of the volume of material passing through the rotary drum metering device, counter means such as shown schematically at 43 may be utilized, with counter means 43 preferrably being in the form of a commercially available counter for rotating devices or assemblies. Such counters operate in conjunction with a cam or finger element on central shaft 25, with such counter assemblies being, of course, commercially available.

In order to assure a clean drum interior and facility, a flexible wiper blade is preferrably secured to the rotary drum assembly, such as along the outer periphery of sleeve 33, as illustrated at 45. Wiper blade 45 is in the form of a rubber wiper element, and may extend along the entire height of sleeve 33, and maintain contact with the inner surface of bottom end plate 27.

For accuracy during operation, it is normally requisite that the end plates of the metering device be rugged, durable, and stiff and resistant to flexure. In the event conventional steel plate is utilized as a material of construction for the end plates, stiffening webs or ribs such as shown at 46 are preferrably utilized.

While the apparatus of the present invention may employ any desired number of radially disposed blades and corresponding chambers, it has been found, for practical purposes, that 8 or 10 such chambers are desireable. The utilization of such a number of chambers has been found to reduce the abrasion and consequent damage to individual kernals of grain being handled therewithin, while still preserving accuracy in operation.

By way of summary, therefore, the rotary drum metering feeder device of the present invention has been found to be particularly adapted for use in grain elevators applications, particularly for metering the loading of grain from the elevator into a waiting grain transporting vehicle such as a railroad car, truck, barge, or overseas shipping vessel.

I claim:

1. A rotary drum metering feeder device comprising:
   (a) a casing defining a generally cylindrical chamber, with said casing including a cylindrical housing with opposed closure plates including a top end plate and a bottom end plate;
   (b) rotary drum means disposed within said chamber including a central shaft journalably retained within said top and bottom end plates on a substantially vertical axis, an outer sleeve, and a plurality of generally radially disposed blades secured at their inner ends to said central shaft and at their outer ends to said outer sleeve, and defining a plurality of metering chambers for retention of particulate solids therebetween;
   (c) an inlet port formed within said top end plate and disposed at a first arcuate disposition between the inner and outer edges of said radially disposed blades;
   (d) an outlet port formed within said bottom end plate between the inner and outer edges of said radially disposed blades, and disposed in arcuately displaced relationship to said inlet port to provide a closed arcuate web zone between each of said inlet port and said outlet port;
   (e) said inlet port including a substantially vertically disposed planar edge surface and a canted edge surface together comprising a wiper blade means, with said canted edge surface being aligned with the radius of said drum means, and said planar edge surface extending non radially outward beyond said canted edge surface, and said canted edge surface being inclined with respect to the planer edge to define therewith an obtuse angle within said inlet port, said wiper blade means in close running clearance with each of said radially disposed blades so as to level the charge of particulate solids within each of said metering chambers rotatably passing from said inlet port to said outlet port; and
   (f) means for determining the number of revolutions of said central shaft.

2. The rotary drum metering feeder device as defined in claim 1 being particularly characterized in that flexible wiper blade means are secured to the outer periphery of said rotary drum sleeve and extending outwardly therefrom in running contact with the inner surface of said cylindrical housing.

3. The rotary drum metering feeder device as defined in claim 1 being particularly characterized in that said rotary drum means includes from between 8 and 10 metering chambers.

4. The rotary drum metering reeder device as defined in claim 1 being particularly characterized in that said canted edge surface is disposed at an angle of approximately 45° to the axis of said central shaft.

5. The rotary drum metering feeder device as defined in claim 1 being particularly characterized in that hopper means are provided adjacent said inlet port for maintaining a supply of particulate solids thereto.

6. The rotary drum metering feeder device as defined in claim 5 being particulary characterized in that stiffening means are provided along said bottom end plate for maintaining the rigidity thereof.

* * * * *